(12) United States Patent
Solarz et al.

(10) Patent No.: US 10,539,244 B2
(45) Date of Patent: Jan. 21, 2020

(54) CHECK VALVE

(71) Applicant: Hamilton Sundstrand Corporation, Charlotte, NC (US)

(72) Inventors: Bartosz Solarz, Wroclaw (PL); Mariusz Fiedziuk, dolnoslaskie (PL)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 15/622,211

(22) Filed: Jun. 14, 2017

(65) Prior Publication Data

US 2017/0356555 A1 Dec. 14, 2017

(30) Foreign Application Priority Data

Jun. 14, 2016 (EP) ..................... 16461525

(51) Int. Cl.
  *F16K 15/03* (2006.01)
  *F16K 27/02* (2006.01)
  *F16K 47/02* (2006.01)

(52) U.S. Cl.
  CPC ........ *F16K 15/038* (2013.01); *F16K 27/0209* (2013.01); *F16K 47/023* (2013.01)

(58) Field of Classification Search
  CPC .... F16K 15/038; F16K 15/033; F16K 47/023; F16K 27/0209; F16K 1/223; Y10T 137/785; Y10T 137/7839; F24F 13/1486; F24F 13/14; F24F 13/18
  USPC .......................................................... 137/904
  See application file for complete search history.

(56) References Cited

U.S. PATENT DOCUMENTS

| 4,867,199 A | * | 9/1989 | Marx ................... F16K 15/038 137/512.1 |
| 4,977,926 A | * | 12/1990 | Hocking .............. A47B 96/068 137/512.1 |
| 8,726,930 B2 | | 5/2014 | Barone |
| 8,800,596 B2 | | 8/2014 | Kamp et al. |
| 8,869,828 B2 | | 10/2014 | Kamp et al. |
| 2008/0053536 A1 | | 3/2008 | Denike et al. |
| 2014/0202562 A1 | | 7/2014 | Kamp et al. |
| 2016/0010757 A1 | | 1/2016 | Barone |

OTHER PUBLICATIONS

Extended European Search Report for International Application No. 16461525.4 dated Dec. 14, 2016, 7 pages.

* cited by examiner

*Primary Examiner* — Reinaldo Sanchez-Medina
*Assistant Examiner* — Nicole Gardner
(74) *Attorney, Agent, or Firm* — Cantor Colburn LLP (57) ABSTRACT

A check valve comprises a valve housing defining a pair of valve openings, a pair of mounting posts arranged on opposed sides of the valve housing, a hinge pin mounted between said mounting posts, a pair of flapper elements pivotably mounted to the one or more hinge pins for rotation relative to the housing between an open position in which they permit fluid flow through the respective valve openings and a closed position in which they prevent fluid flow through the valve openings. A pair of elastically deformable leaf spring stop elements, each of which comprise respective end portions that are mounted to, and extend upwardly from, said mounting posts and a stop portion arching upwardly from, and extending between said end portions, such that each flapper element will engage a respective surface of said stop portion when in the open position.

14 Claims, 8 Drawing Sheets

CHECK VALVE

FOREIGN PRIORITY

This application claims priority to European Patent Application No. 16461525.4 filed Jun. 14, 2016, the entire contents of which is incorporated herein by reference.

TECHNICAL FIELD

The present disclosure relates to check valves.

BACKGROUND

It is known to use check valves to allow fluid flow in one direction, and to prevent flow in the opposite direction. Check valves are widely used in a wide variety of applications, for example in air conditioning systems, for example in aircraft air conditioning systems.

Check valves commonly include a pair of valve elements or flappers located at an opening in a valve housing. The flappers are hingedly supported on a hinge pin mounted to the valve housing for rotation between a closed position in which they lie across and close the opening, preventing fluid flow through the opening in one direction and an open position in which, under the pressure of a fluid (gas or liquid) on one side of the check valve, the flappers rotate from their closed positions so as to allow the fluid to flow through the valve in the opposite direction.

In known check valve arrangements, a stop element is provided to limit the rotational movement of the flapper elements as they open. Typically, the stop elements comprise a stop pin which is mounted to posts arranged on opposed sides of the valve housing opening. The stop pin is spaced from the opening such that when the flappers open, they engage the stop pin.

The flapper elements of such prior art flapper valves typically open at high velocities and may impact the stop pin with considerable force, meaning that the stop pin itself must be sufficiently robust to withstand the impact force of the flapper elements and to avoid the costly and time consuming process of replacing damaged parts. This may mean that the stop pin and the flapper elements may have to be relatively heavy, which may have implications for example in aircraft applications.

The present disclosure relates to a check valve which includes a modified stop element.

SUMMARY

According to the present disclosure, there is provided a check valve comprising a valve housing defining a pair of valve openings, a pair of mounting posts arranged on opposed sides of the valve housing and a hinge pin mounted between the mounting posts. A pair of flapper elements are pivotably mounted to the hinge pin for rotation relative to the housing between an open position in which they permit fluid flow through the respective valve openings and a closed position in which they prevent fluid flow through the valve openings. A pair of elastically deformable leaf spring stop elements arch between the mounting posts. Each of the stop elements comprises a pair of end portions mounted to the mounting posts and a stop portion extending between the end portions such that each flapper element will engage a respective surface of the stop portion when in an open position.

In certain embodiments, the respective surfaces of the stop portions may diverge from each other in a direction away from the valve openings.

In other embodiments, the respective surfaces of the stop portions may extend generally parallel to one another in a direction away from the valve openings.

In certain embodiments, the respective surfaces of the stop portions may be generally planar.

In certain embodiments, the leaf spring stop elements may be two separate elements.

In other embodiments, the leaf spring stop elements may be part of a unitary element.

In certain embodiments, the leaf spring stop elements may be mounted to opposite sides of the mounting posts.

In other embodiments, the leaf spring stop elements may be mounted to a top surface of the mounting posts.

In certain embodiments, the end portions of the leaf spring stop element may be generally U-shaped, each having a first leg adjacent the mounting post and a second leg spaced from and generally parallel to the first leg and joined to the first leg by a bend at its lower end.

In other embodiments, the end portions of the leaf spring stop elements may comprise an S-shaped or C-shaped bend.

In certain embodiments, at least one resilient damping element may be mounted between opposed facing surfaces of the stop portions of the stop elements.

In certain embodiments, the resilient damping element may be a coil spring.

In other embodiments, the resilient damping element may be an elastomer spring.

In certain embodiments, the stop portion of each stop element may extend generally parallel to the hinge pin.

In other embodiments, the stop portion of each leaf spring stop elements may be arcuate or D-shaped.

In certain embodiments, at least one stop element may comprise a hinge pin securing tab which extends at least partially over a hinge pin receiving opening on an outer surface of a respective mounting post to prevent withdrawal of the hinge pin from the opening.

In certain embodiments, the stop element may be formed of a sheet metal, for example of steel, or of a fibre reinforced plastic material.

BRIEF DESCRIPTION OF DRAWINGS

Some exemplary embodiments and features of the present disclosure will now be described by way of example only, and with reference to the following drawings in which.

DETAILED DESCRIPTION

A first embodiment of check valve 2 in accordance with this disclosure is illustrated in FIGS. 1 to 4.

The check valve 2 comprises a valve housing 4. The valve housing 4 is a generally planar annular element which in use may be mounted in a pipe, duct or the like in order to prevent reverse flow of a fluid therethrough. The valve housing 4 comprises a pair of generally D-shaped valve openings 6 which are separated by a central web of the valve housing 4. It will be appreciated that the disclosure is not limited to such a shape of valve openings 6 and other shapes may fall within the scope of this disclosure.

A pair of mounting posts 10 extend upwardly from the valve housing 4. The mounting posts 10 may be integrally formed, for example cast, with the valve housing 4. Alternatively, the mounting posts 10 may be separately formed from the valve housing 4 and mounted thereto by suitable means, for example by welding, brazing or by any other suitable fastening means. It will be appreciated that other mounting post configurations, such as the inclusion of an additional centrally positioned mounting post, for example, fall within the scope of the invention.

A hinge pin 12 is mounted between the mounting posts 10 above the central web. The hinge pin 12 may be a unitary structure (as shown), or be constituted from two or more sections, depending upon the mounting post configuration, for example.

The valve openings 6 are closed by a pair of generally D-shaped flapper elements 14 which are pivotally mounted to the hinge pin 12. It will be appreciated that the disclosure is not limited to such a shape of flapper elements 14 and other shapes may fall within the scope of this disclosure, depending on the shape of the valve openings 6.

The flapper elements 14 are generally planar and include a lower surface 16, an upper surface 18 opposite the lower surface 16, a proximal end 20, a distal end 22 and side ends 24. Each of the flapper elements 14 also include one or more mounting lugs 26, in this embodiment, although not limited to, three mounting lugs 26, positioned at its proximal end 20. The mounting lugs 26 have respective bores through which the hinge pin 12 extends. The mounting lugs 26 of the respective flapper elements 14 alternate along the hinge pin 12.

The flapper elements 14 are configured to move between an open position and a closed position, permitting or preventing flow through the valve openings 6 respectively. It will be appreciated that the arrangement shown in FIG. 3 (i.e. where only one flapper element 14 is in the open position) is simply illustrative, and in practice both flapper elements 14 will move together.

The peripheral region of the lower surface 16 of each flapper element 14 engages a flange surrounding the respective valve openings 6 when the valve 2 is in the closed position, forming a seal therebetween.

As discussed thus far, the construction of the check valve 2 is conventional.

A first embodiment of the present disclosure is illustrated in FIGS. 1 to 4. Check valve 2 comprises a pair of generally inverted "U-shaped" leaf spring stop elements 30 mounted to, and arching between, the mounting posts 10 that are arranged so as to engage the upper surface 18 of the flapper elements 14 as the flapper elements 14 move towards their fully open positions. It will be appreciated that other stop element shapes may fall within the scope of this invention, as will be discussed below.

In this embodiment, the leaf spring stop elements 30 are formed as separate elements, each of which includes respective end portions 32 and a stop portion 34 that extends between and above the mounting posts 10. The end portions 32 are generally vertical (i.e. extending generally parallel to the mounting posts 10) and extend upwardly from or above the mounting posts 10. The stop portion 34 is generally horizontal (i.e. extending generally parallel to the hinge pin 12).

The stop elements 30 are mounted to opposite surfaces of the mounting posts 10 at their respective end portions 32. As illustrated, the stop elements 30 are mounted to the mounting posts 10 by fasteners 36 such as bolts or rivets which pass through the mounting posts 10. In this embodiment, the respective fasteners 36 mount both stop elements 30 to the mounting posts 10. However, it will be appreciated that in other embodiments, the stop elements 30 may be mounted separately to the mounting posts by separate fasteners 36.

Figure 1:
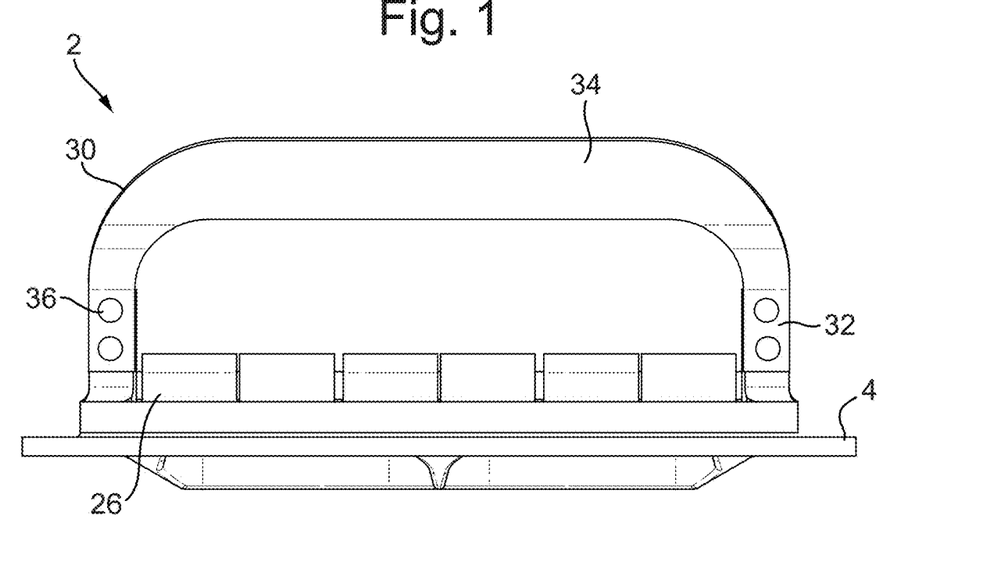
FIG. 1 shows a front view of a first embodiment of check valve in accordance with this disclosure, in a closed position.
Figure 2:
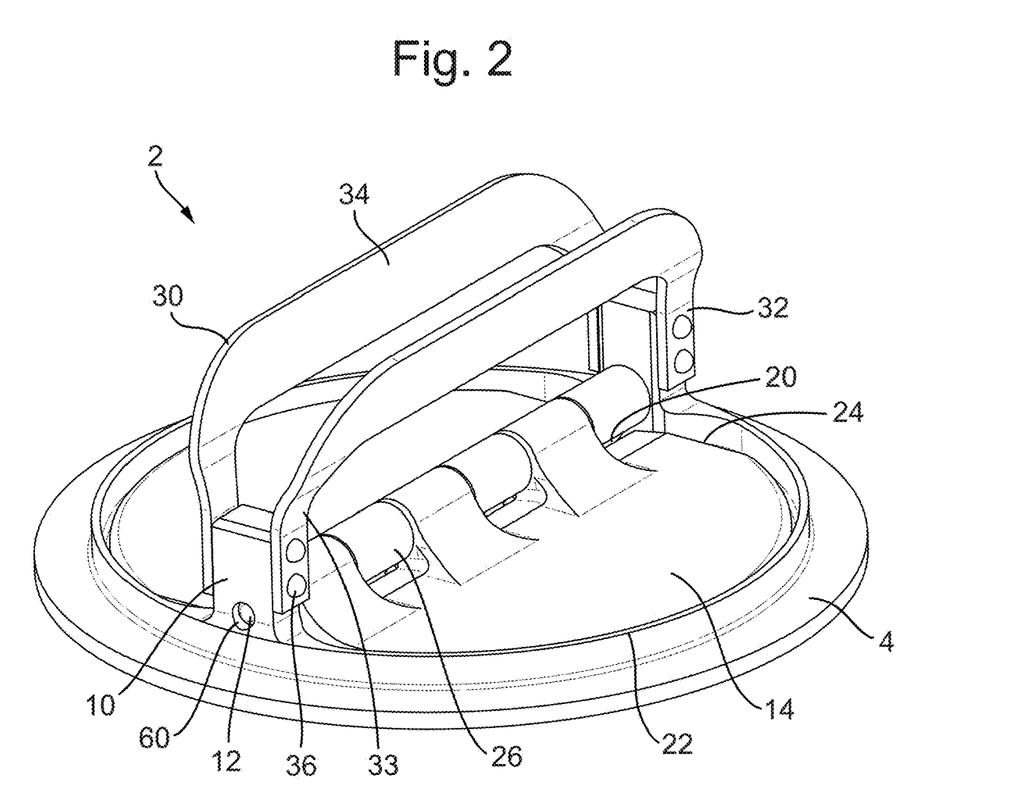
FIG. 2 shows a perspective view of the check valve of FIG. 1.
Figure 3:
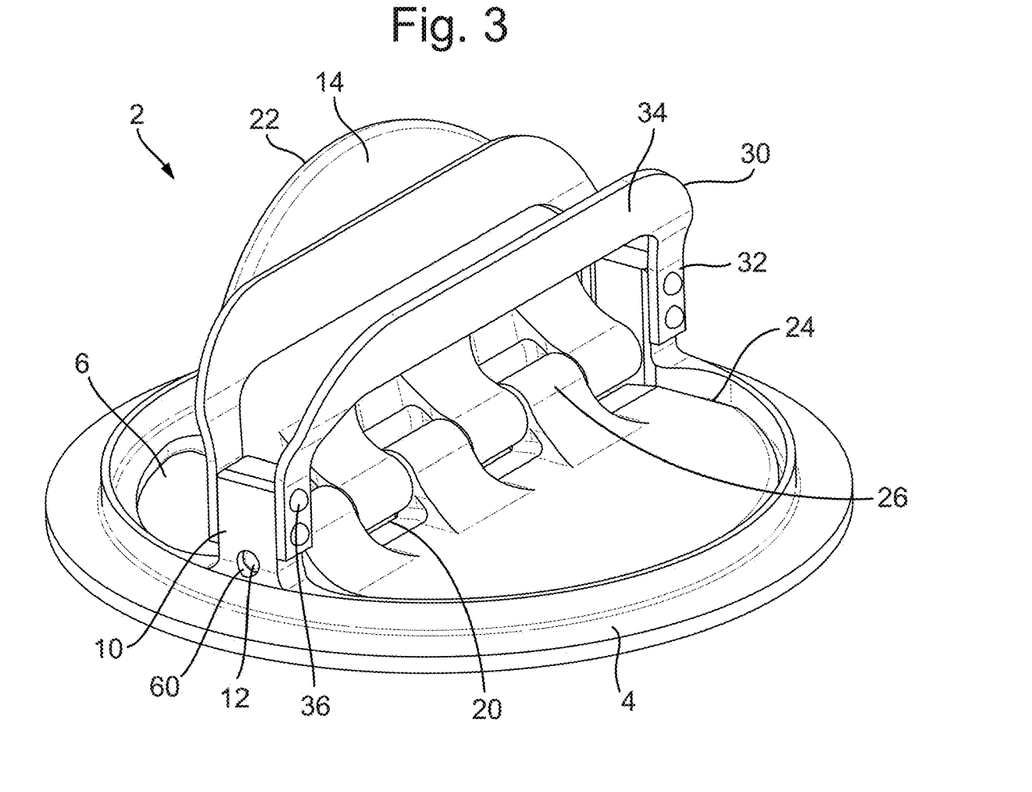
FIG. 3 shows another perspective view of the check valve of FIG. 1, with one flapper element in the fully open position.
Figure 4:
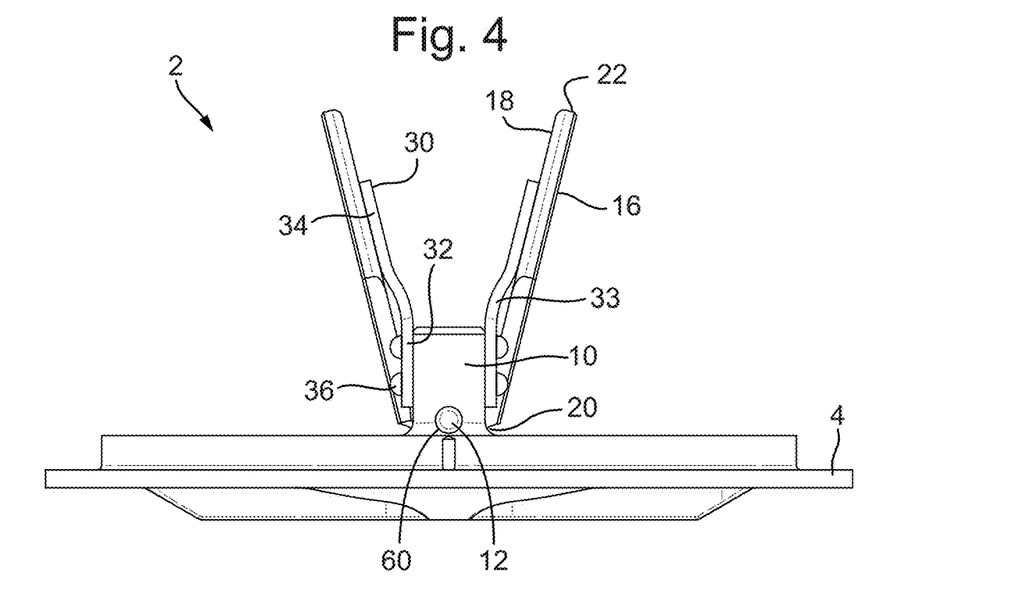
FIG. 4 shows a side view of the check valve of FIGS. 1 to 3, with both flapper elements in the fully open position.

As illustrated in FIGS. 2 to 4, the stop portions 34 of the respective stop elements 30 diverge from one another in a direction away from the valve openings 6. This is effected by means of a shallow "S-bend" 33 in the end portions 32. Of course, other means to create the divergence may be used. The angle of divergence of the stop portions 34 of the stop elements 30 generally determines the maximum opening angle of the flapper elements 14.

In an alternative arrangement (now shown) the stop portions 34 of the respective stop elements 30 may extend generally parallel to one another in a direction away from the valve openings 6.

The outwardly facing surfaces of the stop portions 34 are planar in order to provide a large contact area between the flapper elements 14 and the stop elements 30 for improved stress distribution therebetween during impacts.

Figure 5:
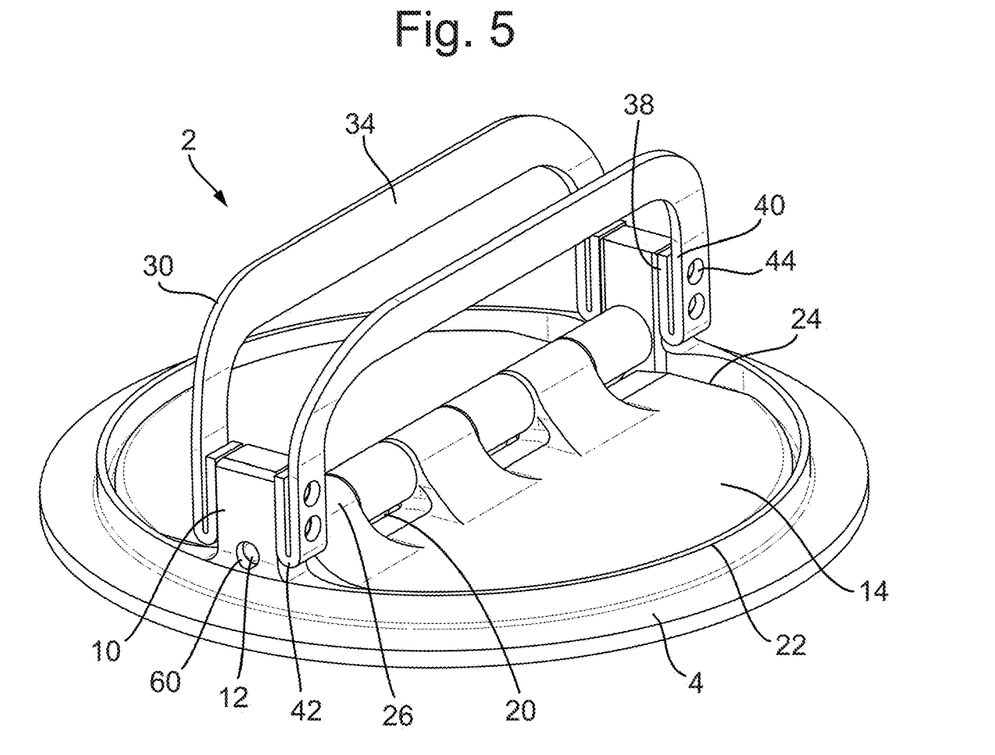
FIG. 5 shows a perspective view of a second embodiment of check valve in accordance with this disclosure.
Figure 6:
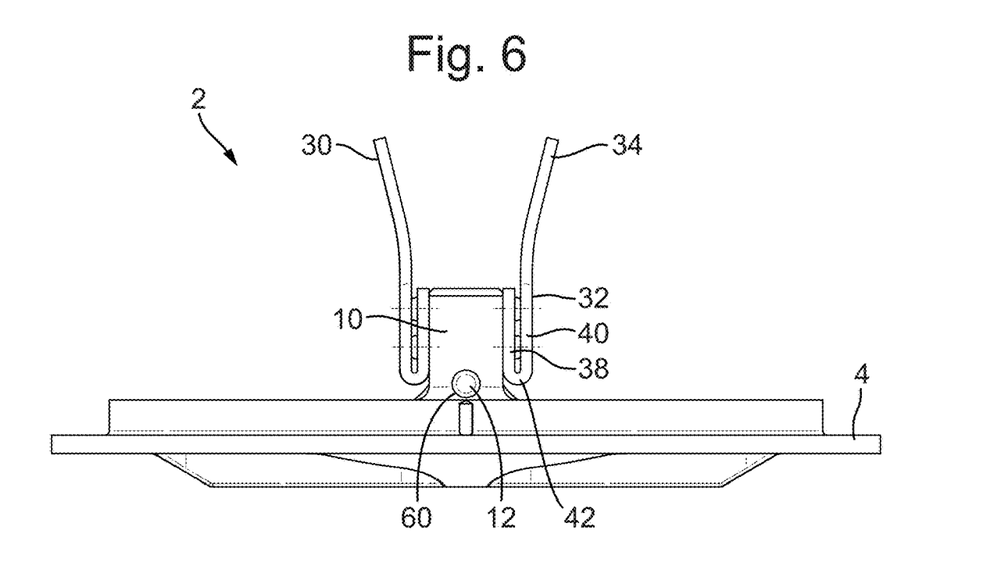
FIG. 6 shows a side view of the check valve of FIG. 5.

A second embodiment of the present disclosure is illustrated in FIGS. 5 and 6. In this embodiment, the end portions 32 of the leaf spring stop elements 30 are generally "U-shaped". That is, the end portions 32 of the stop elements 30 each include a first leg 38 positioned adjacent the mounting posts 10, and a second leg 40 spaced from the first leg 38 that extends generally parallel to the first leg 38. The first leg 38 is joined to the second leg 40 by a U-bend 42 at its lower end. The second legs 40 of the end portions 32 include apertures 44 which permit access to fasteners 36 fastening the stop elements 30 to the mounting posts 10. The fasteners 36 may be similar to those as used in the first embodiment.

Figure 7:
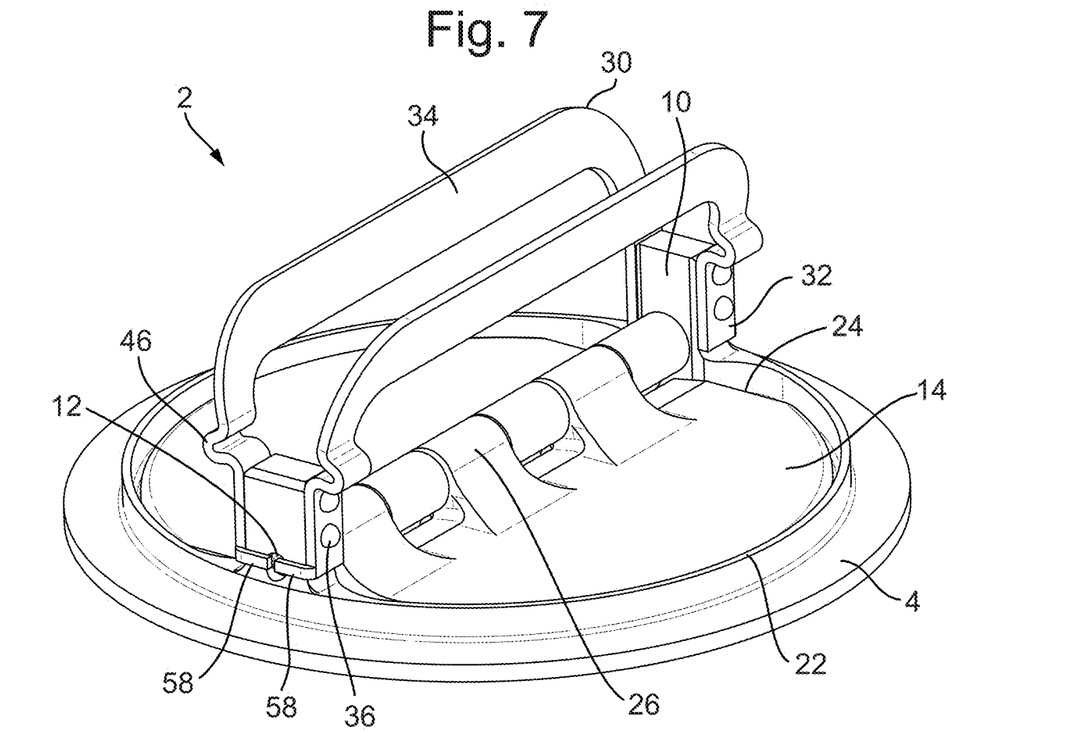
FIG. 7 shows a perspective view of a third embodiment of check valve in accordance with this disclosure.
Figure 8:
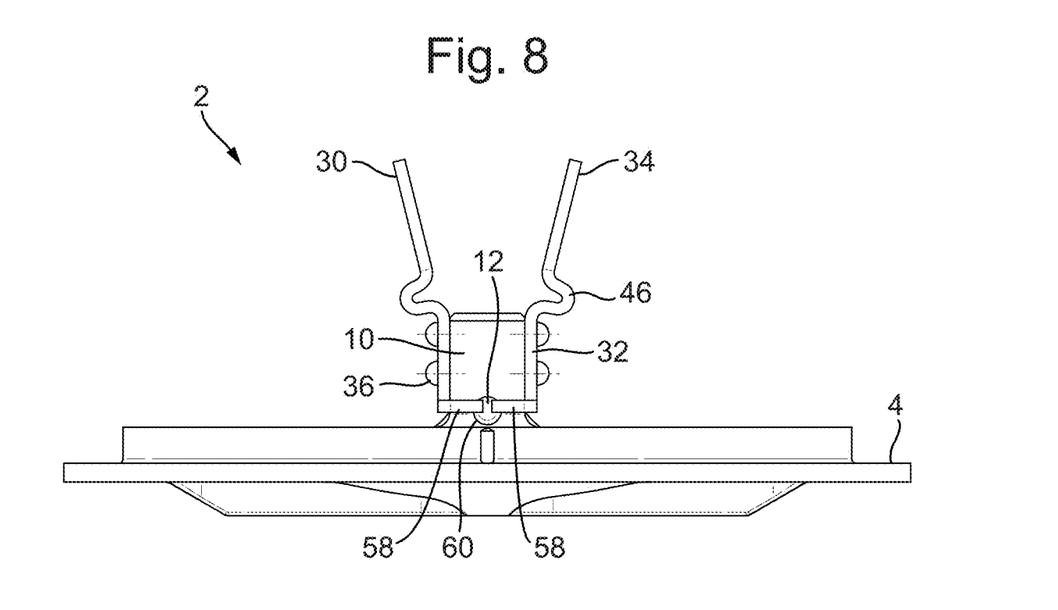
FIG. 8 shows a side view of the check valve of FIG. 7.

A third embodiment of the present disclosure is illustrated in FIGS. 7 and 8. This embodiment is generally similar to the first embodiment. However, in this embodiment, the end portions 32 of the leaf spring stop elements 30 include a generally "C-shaped" bend 46. This is an alternative to the shallow "S-bend" of the first embodiment.

The "U-shaped" or "C-shaped" bends used in the second and third embodiments may be employed to reduce the stiffness (and hence increase the elasticity) of the leaf spring stop elements 30. This may facilitate improved energy dissipation between the leaf spring stop elements 30 and flapper elements 14 during valve 2 operation, for example.

Figure 9:
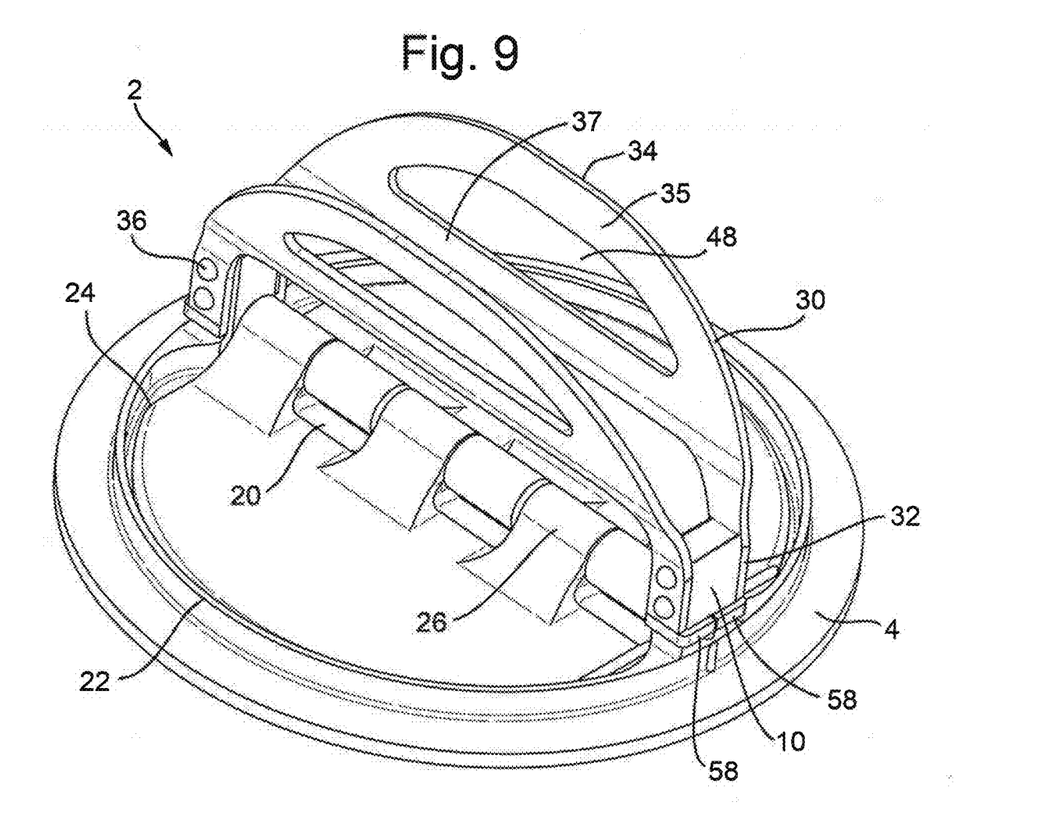
FIG. 9 shows a perspective view of a fourth embodiment of check valve in accordance with this disclosure.
Figure 10:
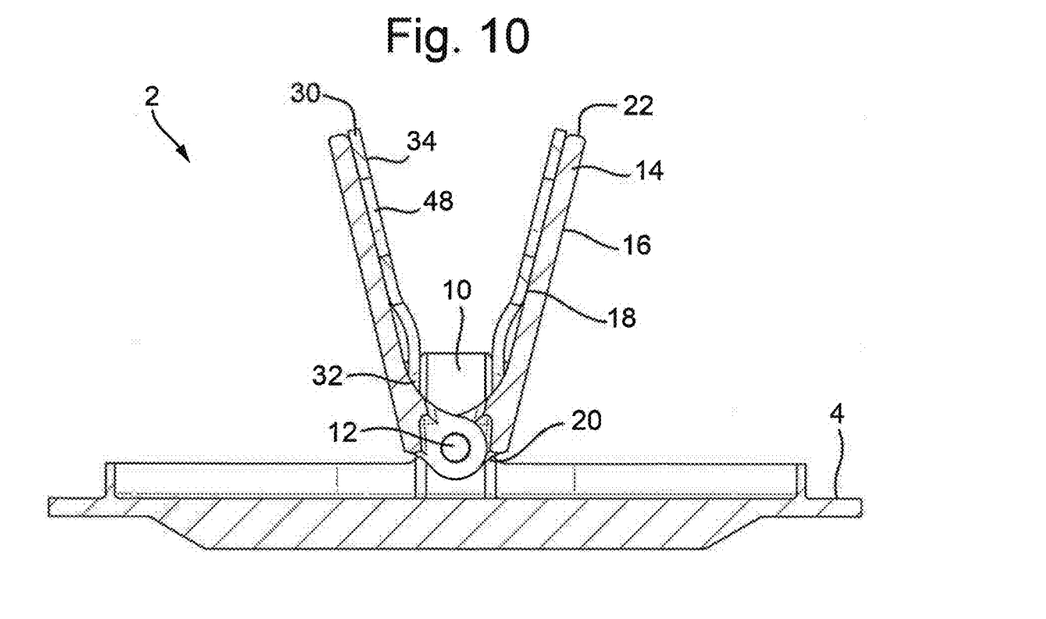
FIG. 10 shows a side view of the check valve of FIG. 9, in the fully open position.

A fourth embodiment of the present disclosure is illustrated in FIGS. 9 and 10. In this embodiment, the stop portion 34 of each stop element 30 is generally "D-shaped". That is, the stop portion 34 includes a generally arcuate upper part 35, and a generally straight cross-bar 37 extending generally parallel to the hinge pin 12 separated by an aperture 48. It will be appreciated that the stop portions 34 may alternatively be generally "C-shaped" (i.e. including the arcuate upper part 35 without the cross-bar 37).

The upper part 35 of the stop portion 34 may, for example, be shaped so as to engage the perimeter of the flapper elements 14 to provide a large contact area between the flapper elements 14 and the stop elements 30 during valve operation, for example.

It will be appreciated that any suitable number of apertures 48 may be included in the stop element 30 of FIGS. 9 and 10 depending on weight saving requirements and/or valve design requirements. For example, the upper part 35 and cross bar 37 may be joined by one or more ribs extending across the aperture 48. In other embodiments, the aperture 48 may be dispensed with.

Figure 11:
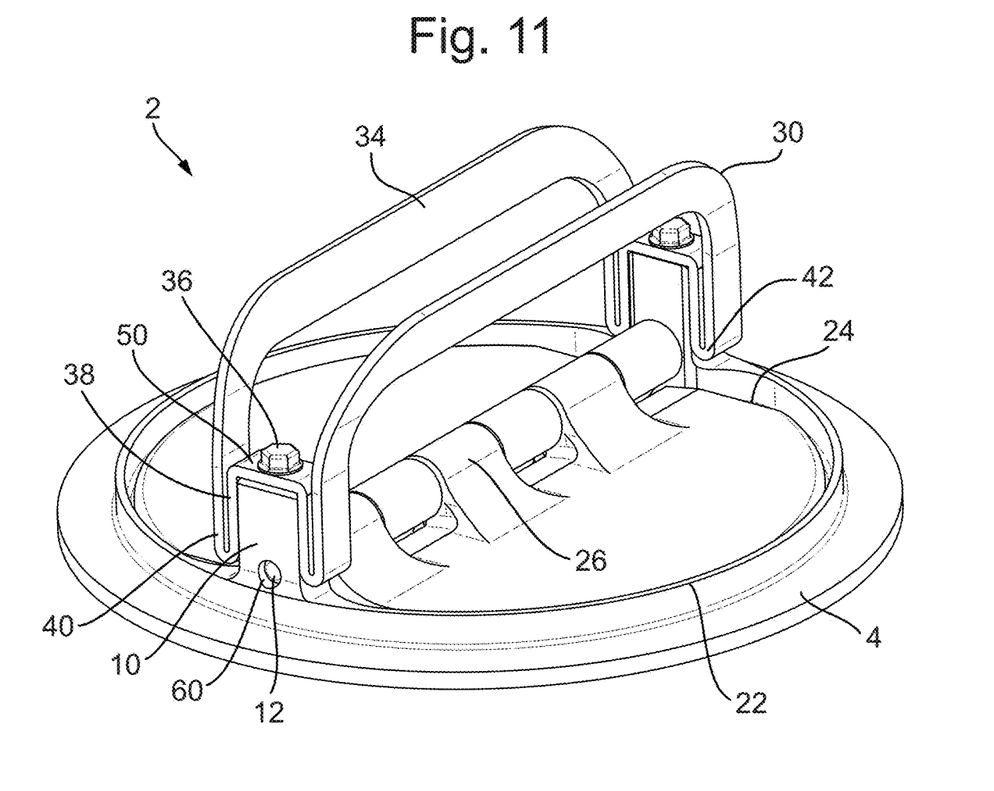
FIG. 11 shows a perspective view of a fifth embodiment of check valve in accordance with this disclosure.
Figure 12:
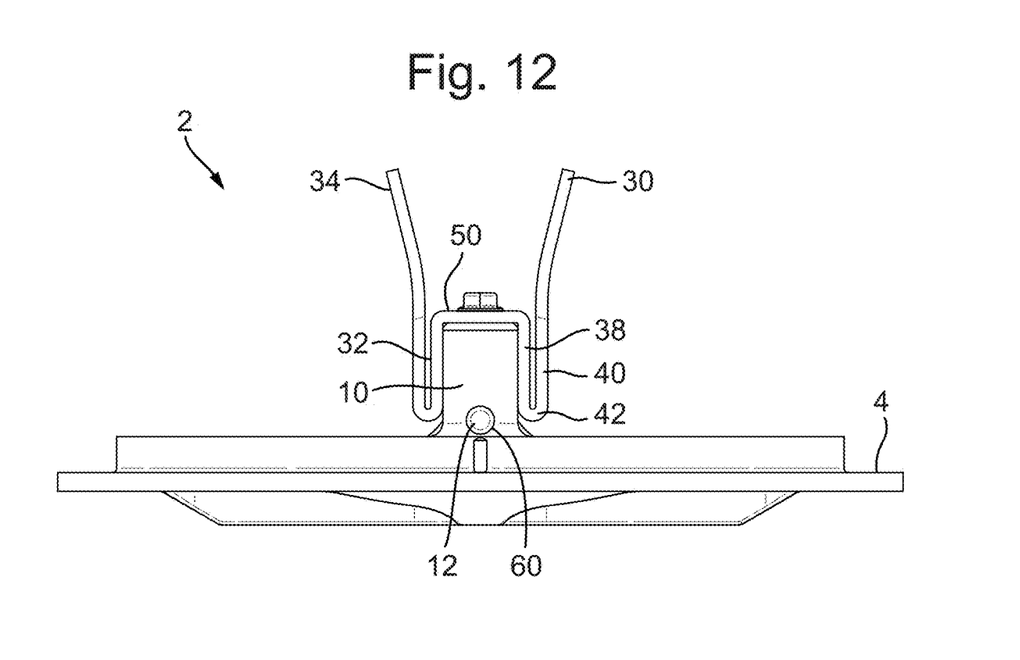
FIG. 12 shows a side view of the check valve of FIG. 11.

A fifth embodiment of the present disclosure is illustrated in FIGS. 11 and 12. In this embodiment, the pair of leaf spring stop elements 30 is formed of a single unitary structure, albeit each of them still arching between the mounting posts 10. Similar to the embodiment illustrated in FIGS. 5 and 6, the end portions 32 are generally "U-shaped". The leaf spring stop elements 30 further include an intermediate portion 50 that extends between the end portions 32 and generally parallel to the top surface of the mounting posts 10. The stop elements 30 are mounted to the top surface of the mounting posts 10 at the intermediate portion 50 by a fastener 36 such as a bolt or a rivet. This may facilitate mounting the stop elements 30. It will, however, be appreciated that the stop elements 30 may be mounted to opposed side surfaces of the mounting posts 10 (similar to the second embodiment, for example). It will be appreciated that any suitable fasteners may be employed.

Figure 13:
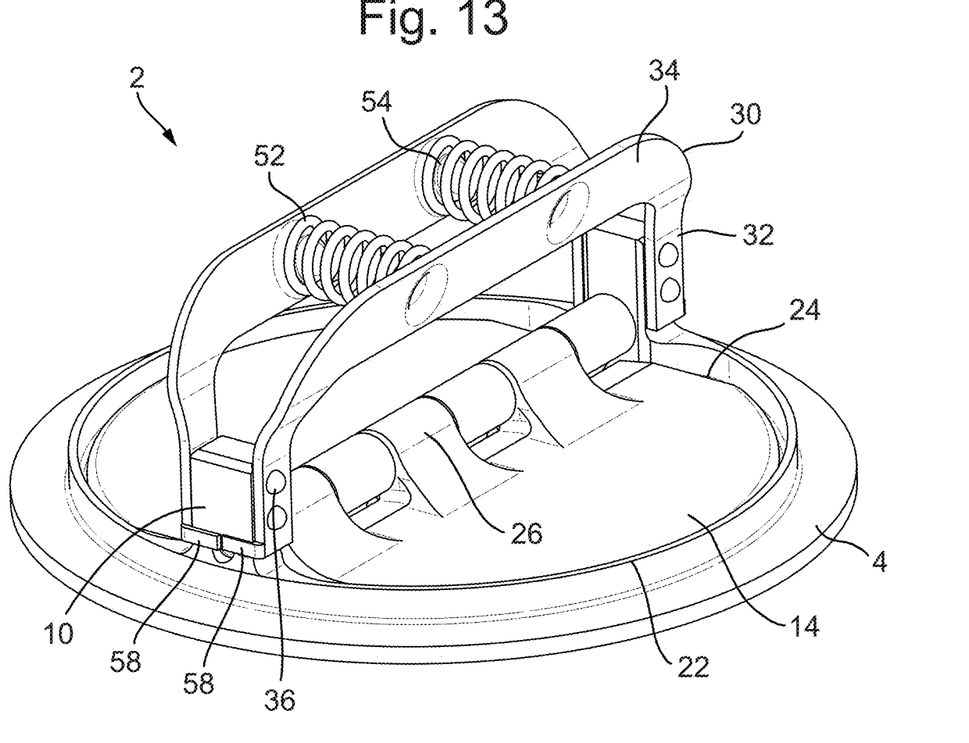
FIG. 13 shows a perspective view of a sixth embodiment of check valve in accordance with this disclosure.
Figure 14:
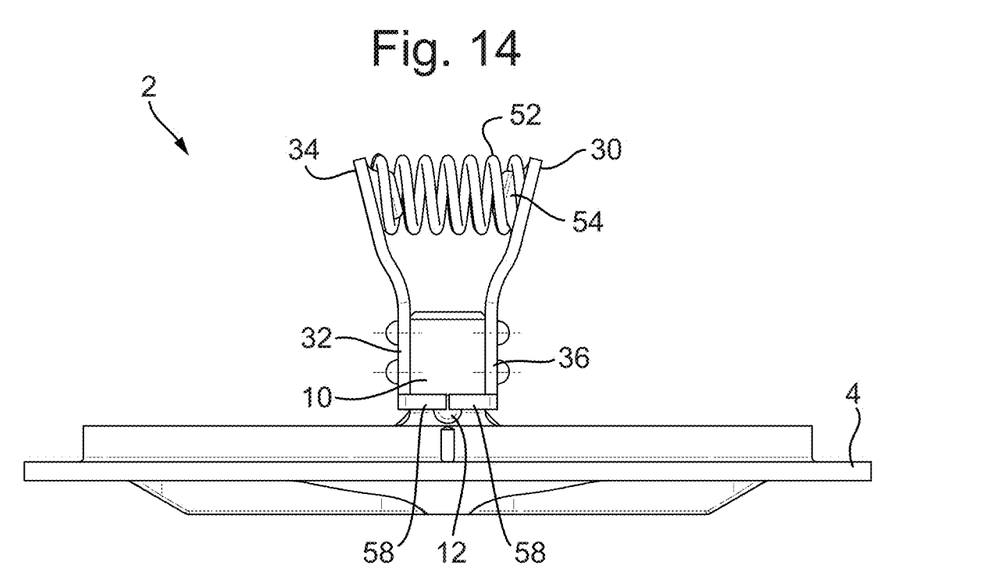
FIG. 14 a side view of the check valve of FIG. 13.

Sixth and seventh embodiments of the present disclosure are illustrated in FIGS. 13 to 16. As shown, check valve 2 further includes one or more resilient damping members 52, 56 mounted between opposed surfaces of the leaf spring stop elements 30. In the first of these embodiments (as shown in FIGS. 13 and 14), the resilient damping member comprises a coil spring 52. Locating formations 54 are formed on the inwardly facing surfaces of the stop elements 30 so as to locate the coil springs 52. The locating formations 54 may simply be pressed out of the stop elements.

Figure 15:
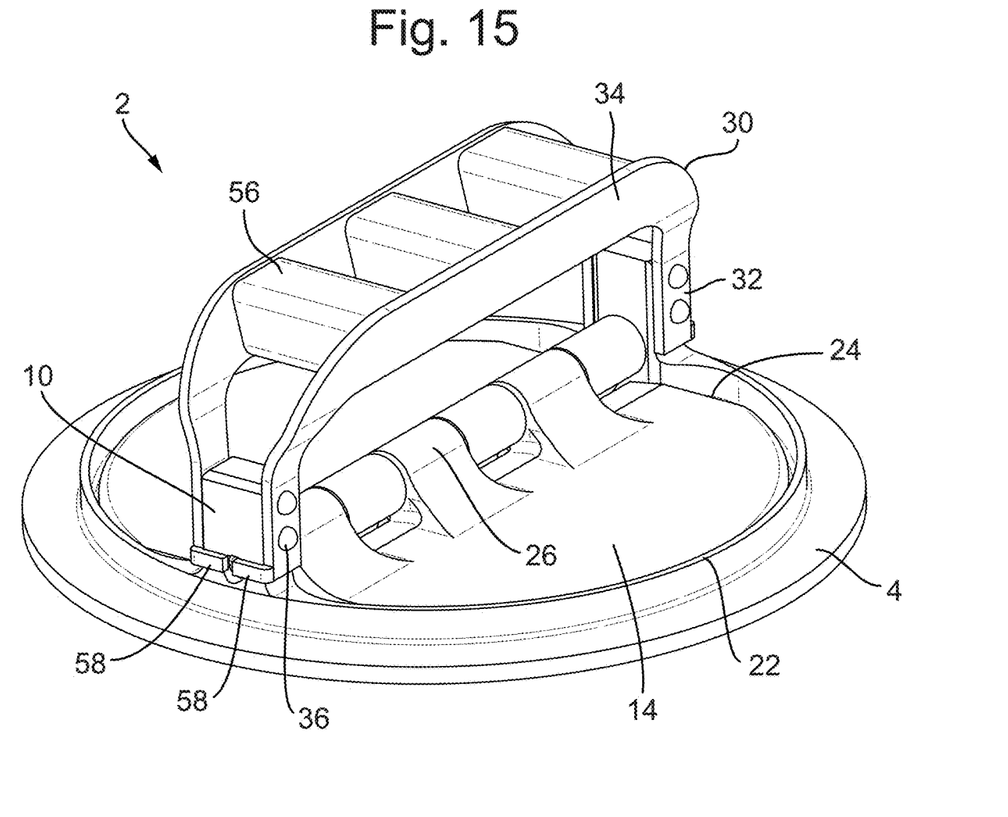
FIG. 15 shows a perspective view of a seventh embodiment of check valve in accordance with this disclosure.
Figure 16:
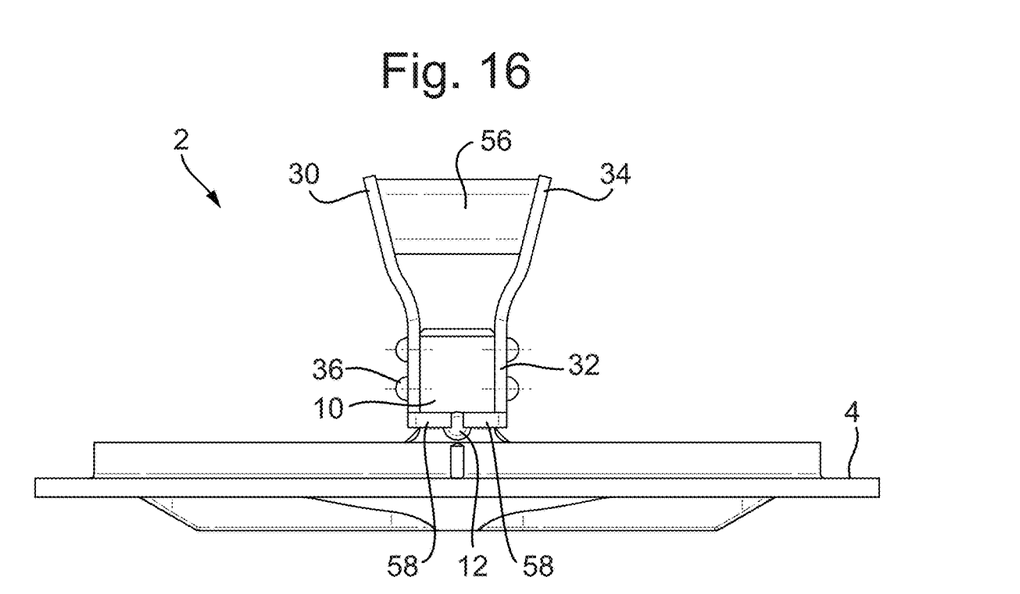
FIG. 16 shows a side view of the check valve of FIG. 15.

In the second of these embodiments (as shown in FIGS. 15 and 16), the damping member comprises an elastomer spring 56. This may be a suitably shaped body of an elastomeric material such as rubber, for example. The elastomeric material may, for example, be retained by mechanical means (such as in the embodiment of FIGS. 13 and 14) or be bonded to the stop elements 30. It will be appreciated that any suitable means could be used to secure the resilient damping members 52, 56 in position.

Any suitable number of resilient damping members 52, 56 may be used, to provide the necessary degree of damping. Also, resilient damping elements 52, 56 of different types may be used together.

In various embodiments (for example, as illustrated in the third, fourth, sixth and seventh embodiments) one or more of the stop elements 30 may include one or more hinge pin securing tabs 58. The tab 58 extends from the end portion 32 and extends over a hinge pin receiving opening 60 formed in the mounting posts 10. This will prevent withdrawal of the hinge pin 12 from the opening 60. It will be appreciated that securing tabs 58 may be provided at one or both ends of the stop element 30, depending on the number of hinge pin receiving openings 60 and/or whether or not the hinge pin 12 is a unitary structure, for example.

In the illustrated embodiments, a tab 58 is provided on adjacent ends of the two stop elements 30, each tab extending over only a portion of the hinge pin opening 60 to secure the hinge pin 12 therein. It will, however, be appreciated that a single tab 58 may extend over either partly or entirely over an opening 60. Although not illustrated in every embodiment, it will be appreciated that the hinge pin securing tab 58 may be incorporated into any of the aforementioned embodiments.

In operation, each of the adjacent flapper elements 14 is configured to move pivotally about the hinge pin 12 between a closed position and an open position (and vice versa). As the flapper elements 14 move toward their open positions, the upper surfaces 18 of the respective flapper elements 14 will engage the stop portion 34 of the leaf spring stop elements 30. Upon engaging the stop portion 34 of the leaf spring stop elements 30, the stop elements 30 elastically deflect toward one another. This elastic deformation of the stop elements 30 dissipates energy as the flapper element 14 impacts the stop element 30. Hence, the leaf spring stop element 30 design may therefore allow the flapper elements 14 to open at higher velocities without inflicting damage to both the flapper 14 and the stop elements 30. This in turn may improve valve lifespan.

The simple geometry of the leaf spring stop elements 30 means a non-complex manufacturing process can be adopted to produce the stop elements 30. For example, the stop elements 30 may be formed from sheet metal by a metal stamping process, for example. Thus, in embodiments, manufacturing and material costs are advantageously kept to a minimum. It will however be appreciated that other suitable manufacturing processes fall within the scope of the present disclosure.

The material chosen to manufacture the flapper elements 14 and the leaf spring stop elements 30 will depend on the particular application. For example, in low temperature and/or pressure applications a fibre reinforced composite material may be suitable. For higher temperature and/or temperature applications, a steel, such as a nickel steel (for example Inconel®) or a stainless steel may be appropriate.

The figures and the accompanying description above describe a particular embodiment of the disclosure and it will be understood that further modifications may be made to the described embodiments without departing from the scope of the disclosure.

The invention claimed is:

1. A check valve comprising:
   a valve housing defining a pair of valve openings;
   a pair of mounting posts arranged on opposed sides of the valve housing;
   a hinge pin mounted between said mounting posts;
   a pair of flapper elements pivotably mounted to the hinge pin for rotation relative to the housing between an open position in which they permit fluid flow through the respective valve openings and a closed position in which they prevent fluid flow through the valve openings; and
   a pair of elastically deformable leaf spring stop elements, each leaf spring stop element arching between the mounting posts and comprising respective end portions mounted to the mounting post, and a stop portion extending between said end portions, such that each flapper element will engage a respective surface of said stop portion when in the open position;

wherein each leaf spring stop element of the pair of leaf spring stop elements, when viewed in a direction transverse to the hinge pin, has an inverted U-shape, a C-shape with a central curved portion of the C-shape uppermost or a D-shape with a central curved portion of the D-shape uppermost, such that the end portions extend upwardly in a direction in which the flapper elements open from the mounting posts and the stop portions extend above the mounting posts.

2. The check valve of claim 1, wherein said respective surfaces of said stop portions diverge from each other in a direction away from the valve openings.

3. The check valve of claim 1, wherein respective surfaces of the stop portions are generally planar.

4. The check valve of claim 1, wherein the leaf spring stop elements are two separate elements.

5. The check valve of any of claim 1, wherein the leaf spring stop elements are part of a unitary element.

6. The check valve of claim 1, wherein the leaf spring stop elements are mounted to opposite sides of the mounting posts.

7. The check valve of any of claim 1, wherein the leaf spring stop elements are mounted to a top surface of the mounting posts.

8. The check valve of claim 1, wherein the end portions of the leaf spring stop elements are generally U-shaped, each having a first leg adjacent the mounting posts and a second leg spaced from and generally parallel to the first leg and joined to the first leg by a bend at a lower end.

9. The check valve of claim 1, wherein the end portion of the leaf spring stop element comprises an S-shaped or C-shaped bend.

10. The check valve of claim 1, further comprising at least one resilient damping element mounted between opposed facing surfaces of said stop portions of said stop elements.

11. The check valve of claim 1, wherein the stop portion of each stop element extends generally parallel to the hinge pin.

12. The check valve of claim 1, wherein the stop portion of each leaf spring stop elements is arcuate or generally D-shaped.

13. The check valve of claim 1, wherein at least one stop element of the pair of elastically deformable leaf spring stop elements comprises a hinge pin securing tab which extends at least partially over a hinge pin receiving opening on an outer surface of a respective mounting post of the pair of mounting posts to prevent withdrawal of the hinge pin from the opening.

14. The check valve of claim 1, wherein the stop element is formed of sheet metal, for example of steel, or a fibre reinforced plastic.

* * * * *